2,767,227

FLUORINATING HALO-FLUOROCARBONS WITH HYDROGEN FLUORIDE AND ALUMINUM FLUORIDE

John D. Calfee, Dayton, Ohio, and Charles B. Miller, Lynbrook, N. Y., assignors to Allied Chemical & Dye Corporation, New York, N. Y., a corporation of New York No Drawing. Application October 16, 1952, Serial No. 315,202

2 Claims. (Cl. 260—653)

This invention relates to the preparation of aliphatic compounds rich in fluorine by disproportionating starting materials of lower fluorine content. More specifically the invention is directed to the preparation of 1,1,1-trifluoroethane ($CH_3CF_3$) and 1,1,1-trifluoro-2-chloroethane ($CH_2ClCF_3$) from respectively 1,1,1-difluorochloroethane ($CH_3CClF_2$) and 1,2 - dichloro - 1,1 - difluoroethane ($CH_2ClCClF_2$). The materials are useful as refrigerants and as chemical intermediates in synthesizing other compounds.

Usual processes for fluorinating organic compounds call for utilization of fluorine, hydrogen fluoride or metallic fluorides as fluorinating agent, i. e. as extraneous source of fluorine. A particular object of the present invention is to develop an easily controlled and commercially feasible gas phase-catalysis process form forming more highly fluorinated products from fluorinated starting materials of lower fluorine content, which process does not require use of an extraneous source of fluorine, that is, the starting materials themselves furnish all the fluorine required for the sought-for product.

The invention is especially and preferably directed to the manufacture of $CH_3CF_3$. In accordance with this phase of the invention, as detailed below for illustrative purposes, the starting material, $CH_3CClF_2$, in the gas phase is contacted under certain hereinafter defined temperature conditions with aluminum fluoride of extremely small crystal size. These aluminum fluorides have the property of catalyzing the disproportionation of $CH_3ClF_2$ to form $CH_3CF_3$ to such an extent that high yields and efficient and smooth operation may be realized under readily maintained operating conditions. Hence, when $CH_3CClF_2$ is contacted with our aluminum fluoride catalyst, disproportionation to $CH_3CF_3$ takes place with high yields and conversions of desired products as compared with previously proposed procedures. In addition to the primary sought-for material $CH_3CF_3$, vinylidene chloride ($CH_2=CCl_2$), a valuable compound widely used as a monomer in polymerization reactions, is also formed and may be recovered separately. By the term "conversion" we mean the amount of starting material which undergoes reaction. By the term "yield" we mean the percentage of the sought-for product recovered based on the amount of such product theoretically obtainable from the starting material converted.

Aluminum fluorides from a multiplicity of sources are known in the art. The majority of such materials consists of lumps or smaller discrete particles, which lumps or particles in turn are composed of $AlF_3$ crystals of relatively large size, i. e. several thousand Angstrom units radius and above. However, certain forms of $AlF_3$, when examined even by the highest powered optical microscope, appear to be of non-crystalline or "amorphous" structure. When such "amorphous" aluminum fluorides are examined using X-ray diffraction technique, extremely small, sub-microscope crystals, "crystallites," may be detected. According to our invention, such "amorphous" aluminum fluorides, having crystals of certain submicroscopic (crystallite) size, are used in the disproportionation of $CH_3CF_2Cl$ to $CH_3CF_3$ and $CH_2=CCl_2$. Enhanced catalytic activity may be noted by use of aluminum fluorides of crystallite size of about 500 A. radius or below and accordingly the advantages of our invention may be realized operating with such catalytic material. As crystallite size decreases below this value, desired catalytic activity increases and particularly suitable aluminum fluorides include those having crystallite size of about 200 A. and below (as determined by X-ray diffraction technique). We have found that by contacting $CH_3CF_2Cl$ with our improved catalyst, transformation to $CH_3CF_3$ and $CH_2=CCl_2$ may be realized under favorable and easily maintained operating conditions. Although advantageous catalytic properties realized in practice of the invention are peculiar to crystallites, such properties are not destroyed but merely diluted by the presence of the larger crystals.

Suitable aluminum fluorides for the purpose in view are defined as above on the basis of crystallite size and are not limited to any particular method of preparation of the catalyst. Aluminum fluorides having the indicated crystallite size and catalytic activity are included within the scope of the invention regardless of method of preparation. However, according to a particular embodiment of our invention, improved catalytic material prepared by treating aluminum halide other than aluminum fluoride (which halide is preferably in pure form but may suitably be of commercial or technical grades) with preferably excess quantities of fluorinating agent reactive therewith under conditions such that any water present in the reacting materials is volatilized and removed, is employed. For example, catalyst may be prepared by treating aluminum halide hydrate with gaseous fluorinating agent (said agent being preferably, but not necessarily, anhydrous) at temperature above that at which the water in the hydrate is volatilized into the gas, e. g. above about 130° C., preferably about 150° C.–170° C. If desired, anhydrous reagents may be employed, in which case maintenance of elevated temperatures during the catalyst preparation reaction is not critical and said reaction may even be carried out in the liquid phase. Of the fluorinating agents which may be used for catalyst preparation, boron trifluoride and hydrofluoric acid may be mentioned. We prefer hydrofluoric acid. Aluminum chloride is the preferred halide, in which case catalyst synthesis reaction is believed to proceed as follows:

$$3HF + AlCl_3 = AlF_3 + 3HCl$$

HF displaces HCl causing transformation of $AlCl_3$ into $AlF_3$ with evolution of HCl. The remaining aluminum fluoride is activated by heating in an anhydrous inert atmosphere at elevated temperature, i. e. temperature at which activation (presumably accompanied by vaporization and removal of traces of adhering water) takes place, and the finished catalyst is recovered. We have found that heating the $AlF_3$ in a stream of dry nitrogen or HF gas for about one to four hours at temperatures of about 300–350° C. or 4 to 6 hours at 250–300° C. is ordinarily suitable for this purpose.

Although not essential to realization of the objects of the invention, a suitable and convenient means for preparing the aluminum fluoride catalyst is to add solid anhydrous aluminum chloride to an excess of liquefied anhydrous hydrofluoric acid in a cooled container and, after complete addition of the aluminum chloride, mildly agitate the mixture until reaction is substantially complete. The $AlF_3$ so prepared is then activated as outlined above. Aluminum fluoride prepared by treating, e. g. aluminum chloride hydrate with HF gas at 150–170° C. until reaction is complete, and thereafter heating the product to about 300° C. in a stream of HF gas for several hours has also been found to be composed of crystallites of size substantially below 200 A. as desired for disproportionation CH₃CF₂Cl according to a preferred embodiment of the invention.

If desired, the catalyst may be used in the form of a fluidized solid bed or suspended on a non-siliceous inert carrier such as activated alumina, activated carbon, metal fluorides or nickel. Suitable methods for preparing this suspended catalyst include dissolving the aluminum compound in a solvent therefor, applying the solution to the carrier, evaporating the solvent and then treating the aluminum compound impregnated carrier with fluorinating agent. According to an alternative procedure, the aluminum compound, if volatile, may be heated and thereby sublimed into a gas stream and subsequently condensed on the carrier after which it is treated with fluorinating agent as above. Specifically, aluminum chloride may be dissolved in ethyl chloride or an aqueous solvent, then applied to the carrier, and subsequently treated with hydrofluoric acid, or aluminum chloride may be volatilized into a gas stream, condensed on the carrier, and then treated to convert it to aluminum fluoride.

While with respect to manufacture of $CH_3CF_3$ from $CH_3CClF_2$, the mechanism of the reaction is not entirely clear, the over-all effect appears to be that some of the molecules of $CH_3CClF_2$ serve as a source of fluorine for other molecules. The molecules which accept fluorine thereby form the more highly fluorinated compound $CH_3CF_3$ and the molecules which donate fluorine form principally the fluorine free compounds vinylidine chloride and hydrogen chloride. The reaction which takes place may be of the nature of

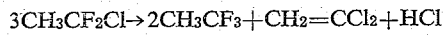

$$3CH_3CF_2Cl \rightarrow 2CH_3CF_3 + CH_2=CCl_2 + HCl$$

Appreciable, though minor, amounts of unreacted $CH_3CF_2Cl$ may also be present in the reaction zone exit gas. As to production of $CH_2ClCF_3$ from $CH_2ClCClF_2$, it appears that the same type of reaction is involved, and in addition to $CH_2ClCF_3$, some HCl and variable amounts of $CHCl=CCl_2$ and $CHCl=CF_2$ are formed.

Reaction zone temperatures are maintained at or above the level at which disproportionation of the respective starting material begins to take place. In both instances, some appreciable reaction takes place at temperature as low as about 200° C. and at about 250° C., reactions resulting in the formation of trifluorocarbons are substantial. However, with regard to production of $CH_3CF_3$ at temperatures below about 270° C., there may be appreciable formation of $CH_2=CClF$ at the expense of the primarily sought for $CH_3CF_3$ and $CH_2=CCl_2$. Hence, to afford practical yields of these sought-for products, temperatures of about 270° C. and above are preferred. As to production of both trifluorocarbons, disproportionation proceeds and important yields may be realized at temperatures as high as 400° C., but as temperature is increased above 360° C. deposition of carbon on the AlF₃ catalyst may be noted. Accordingly, in preferred embodiments of both aspects of the invention, reaction zone temperature is maintained at or below about 360° C. In the production of $CH_2ClCF_3$, preferred temperatures are of the order of 300° C. plus or minus about 25° C. As indicated below, choice of temperature is a factor of importance in selecting the time or period of contact of reactant with catalyst which may be maintained without sacrificing desired high conversions and yields. Higher temperatures tend to increase speed of reaction and thereby afford high conversion even at short time of contact, leading to greater poundage output rate of all products for a given reactor. The temperature range within which such desired high reactor capacity, in both aspects of the invention, may be obtained without entailing excessive decomposition of products due to the higher temperature is in the approximate range of 300 to 360° C., and accordingly in some operations this range is particularly preferred.

Time of contact of starting material with the aluminum fluoride catalyst may be varied to some extent without noticeable sacrifice in advantageous high yield and efficiency of operation. However, if contact time is excessive, i. e. at very low space velocities, the capacity of the reactor is low thereby causing economic disadvantages in the operation. On the other hand, if contact time is too short, i. e. at excessively high space velocities, the reaction of the starting material to form the desired product may be incomplete thereby entailing possible high cost of recovering and recycling unreacted material to subsequent operation. Accordingly, in determining the time of contact to be employed, features such as the economic advantage of high reactor capacity obtained at short contact times as against cost of recovery of unreacted starting material may be taken into consideration. In most operations of both aspects of the invention, contact times—expressed as the number of units of time (e. g. seconds) required for one volume of reactant, as a gas measured at room temperature and at atmospheric pressure, to pass through one volume of catalyst—in the range of about 4 to 90 seconds give good results. For production of $CH_3CF_3$ from $CH_3CClF_2$, contact time in the range of about 4–70 seconds is preferred. In any particular operation optimum rate of flow of reactants through the reaction zone is dependent upon variables, such as scale of operation, quantity of catalyst in the reactor, and specific apparatus employed, and may be determined by a test run.

For convenience, atmospheric pressure operation is preferred, but the reaction may, if desired, be carried out at superatmospheric or subatmospheric pressure, the latter tending to favor decomposition. However, choice of pressure is largely one of convenience, e. g. determined by the nature of prior treatment of the starting material or subsequent treatment of products.

Generally, the process of the invention is carried out by contacting the starting material with the catalyst at temperature at which disproportionation takes place. Operations may be suitably carried out by introducing a gaseous material comprising the starting material into a reaction zone containing the AlF₃ prepared as above and heating said material at temperatures and for time periods heretofore indicated, withdrawing gaseous products from the zone and recovering the sought-for products from the gaseous exit of the reactor. Although not limited to continuous operations, the process of our invention may be advantageously carried out thereby. It is preferred to utilize substantially pure $CH_3CClF_2$ or $CH_2ClCClF_2$ as starting material and introduce such material in the gas phase into the reaction zone. However, this does not preclude introducing starting material diluted with other gaseous material, e. g. an inert gas such as nitrogen, into the reaction zone. If impure starting material is available and it is desirable to carry out disproportionation thereof to produce the above indicated products, such material may be introduced into the reaction zone, contacted with aluminum fluoride catalyst and disproportionation brought about as indicated.

Various reaction products in the reaction zone exit gas stream may be recovered separately or in admixture in any suitable manner. The gas discharged from the reactor is recovered by scrubbing with water and optionally with caustic (if it is desired to remove traces of HCl and HF), then passed over calcium chloride or other drying agent to remove water, and condensed in a vessel maintained at temperatures substantially below the boiling point of the lowest boiling material present, e. g. by cooling the gas in a bath of acetone and carbon dioxide ice. In production of $CH_3CF_3$ from $CH_3CClF_2$, the principal products condensed are $CH_3CF_3$ (B. P. minus 47° C.), $CH_2=CCl_2$ (B. P. plus 31.4° C.), unreacted $CH_3CF_2Cl$ (B. P. minus 9° C.) and possibly small amounts of 1,1-chlorofluoroethylene $CH_2=CClF$ (B. P. minus 25.5° C.). In manufacture of $CH_2ClCF_3$ from $CH_2ClCClF_2$, the principal products condensed are $CH_2ClCF_3$ (B. P. 6.1° C.), $CHCl=CCl_2$ (B. P. 88° C.), $CHCl=CF_2$ (B. P. minus 19° C.), and unreacted $CH_2ClCClF_2$ (B. P. 46.8° C.). Individual compounds may be recovered, e. g. by distillation, from condensate obtained above. Unreacted starting material may be recycled to subsequent operation.

Any suitable chamber or reactor tube constructed of inert material may be employed for carrying out the reaction provided the reaction zone afforded is of sufficient length and cross-sectional area to accommodate the required amount of aluminum fluoride necessary to provide adequate gas contact area, and at the same time afford sufficient free space for passage of the gas mixture at an economical rate of flow. Material such as nickel, graphite, inconel and other materials resistant to HF may be mentioned as suitable for use as reactor tube. Externally disposed reactor tube heating means such as electrical resistance heaters may be supplied.

The following examples illustrate practice of our invention, parts and percentages being by weight:

*Example 1.*—300 parts of granular (8 to 18 mesh) anhydrous aluminum chloride of commercial grade were added in small portions to liquid anhydrous hydrofluoric acid contained in an externally cooled vessel. A vigorous exothermic reaction took place and additional amounts of hydrofluoric acid were added as needed to maintain an excess thereof. After all the aluminum chloride had been added, the mixture was stirred to promote residual reaction. When reaction of aluminum chloride appeared complete, the mass was mixed and stirred with additional liquid hydrofluoric acid and excess HF was removed by slowly boiling the mixture. 200 parts of anhydrous aluminum fluoride ($AlF_3$) of about 10–40 mesh size were recovered. This $AlF_3$ was heated in a stream of dry inert gas (nitrogen) at a sufficiently elevated temperature (250–300° C.) and a period of time sufficiently long (4–6 hours) to activate the material. At the time the treatment of the $AlF_3$ with the hot nitrogen was discontinued, only trace quantities of HF could be detected in the effluent nitrogen stream. An X-ray diffraction pattern of material prepared according to the method outlined above was made, which indicated crystallite size to be less than about 100 Angstrom units, i. e. the crystallite size was so small as to be indicative of "amorphous" structure. The size distribution of the $AlF_3$ particles did not change appreciably during the latter heat treatment.

200 parts of aluminum fluoride catalyst prepared as above were arranged on a fixed bed supported on a 100 mesh nickel screen in a vertically mounted 2" internal diameter, 18½" long nickel tube. The tube was externally electrically heated and the tube ends were fitted with pipe connections for the inlet and outlet of a gas stream and for the insertion into the nickel tube and catalyst bed of a suitable thermocouple. Gaseous 1,1,1-difluorochloroethane was introduced into the bottom of the nickel tube at a rate approximating 0.96 part per part of catalyst per hour, and passed upwardly through the bed of $AlF_3$. By suitably adjusting the electrical heaters thereby to control the rate of heat input into the gas stream, the temperature of the catalyst bed was maintained at about 300° C. Gaseous products of the reaction were withdrawn overhead, cooled to about 30° C., thence passed successively through a water scrubber, a drier containing $CaCl_2$ as the drying agent and a condenser held at about minus 78° C. by means of an external cooling bath of carbon dioxide ice and acetone. After passing 1085 parts $CH_3CF_2Cl$ through the nickel reactor as above, operation was discontinued. Contact time was of the order of 17–19 seconds. The liquefied material in the Dry Ice-acetone condenser was distilled and the following amounts of products were recovered: $CH_3CF_3$, 540 parts; $CH_2=CCl_2$, 285 parts; $CH_3CF_2Cl$, 53 parts. Of the total $CH_3CF_2Cl$ which was introduced into the reactor, 95% was converted to all products and 89% was converted to $CH_3CF_3$. Yield of $CH_3CF_3$, i. e. the percentage of the $CH_3CF_3$ recovered based on the amount of $CH_3CF_3$ theoretically obtainable from the $CH_3CF_2Cl$ converted was 93% and yield of vinylidene chloride was 86%.

*Example 2.*—Gaseous $CH_3CF_2Cl$ was passed through a vertical nickel tube arranged as described in Example 1 and containing 100 parts of $AlF_3$ catalyst prepared by the method outlined in Example 1 and having a crystallite size less than 200 Angstrom units. The internal temperature of the tube was maintained at 350° C., and $CH_3CF_2Cl$ was introduced at the rate of about 1.7 parts per part of catalyst per hour. Contact time was of the order of 11–12 seconds. The gas effluxing the reactor was scrubbed with water, dried and condensed. After so treating 201 parts of $CH_3CF_2Cl$, the condensate was distilled and recoveries were as follows: $CH_3CF_3$, 84 parts; $CH_2=CCl_2$, 48 parts; and $CH_3CF_2Cl$, 45 parts. Conversion of $CH_3CF_2Cl$ was 78%. Conversion to $CH_3CF_3$ was 75%. Yields of $CH_3CF_3$ and $CH_2=CCl_2$ were 96.5% and 96%, respectively.

*Example 3.*—Gaseous $CH_3CF_2Cl$ was passed through the apparatus and catalyst described in Example 1 at a rate of about 0.98 part per part of $AlF_3$ catalyst per hour, while maintaining the reactor temperature at about 275° C. Contact time was of the order of 18–20 seconds. Gaseous products of the reaction were withdrawn overhead, passed through a water scrubber, thence through a low temperature condenser to liquefy the water scrubber effluent. After passing 1050 parts of $CH_3CF_2Cl$ through the reactor in this manner, the condensate was removed from the condenser and distilled. Product recovery was as follows: $CH_3CF_3$, 507 parts; $CH_2=CCl_2$, 274 parts; and $CH_3CF_2Cl$, 102 parts. Conversion of $CH_3CF_2Cl$ to all products was 90.4%, and to $CH_3CF_3$, 87%. The yield of $CH_3CF_3$ was 96%.

*Example 4.*—Operations described in Example 1 were repeated except that reaction temperature was maintained at about 265° C. After charging 943 parts of $CH_3CF_2Cl$, the liquid in the condenser was distilled and product recovery was as follows: $CH_3CF_3$, 397 parts; $CH_2=CCl_2$, 184 parts; $CH_2=CClF$, 91 parts; and $CH_3CF_2Cl$, 137 parts. Conversion of $CH_3CF_2Cl$ to all products was 86% and to $CH_3CF_3$, 76%. The yield of $CH_3CF_3$ was 88%.

*Example 5.*—Gaseous $CH_2ClCClF_2$ was passed through a reactor similar to that described in Example 1 and containing about 80 cc. of $AlF_3$ catalyst prepared in a manner similar to the method outlined in Example 1 and having a crystallite size of less than 200 Angstrom units. Temperature in the reactor was maintained at about 300° C. throughout the duration of the run which proceeded for about one hour and 34 minutes. About 107 grams of starting material were passed through the reactor, and contact time was of the order of 23–24 seconds. The gases effluxing the reactor were scrubbed with water, and dried. Dried gases were sampled periodically and the samples were passed into an infra-red gas analysis cell. Infra-red measurements showed the presence in the gases of substantial proportions of $CH_2ClCF_3$, and lesser amounts of $CHCl=CF_2$ and $CH_2ClCClF_2$.

This application is a continuation-in-part of our co-pending application Serial No. 179,091, filed August 12, 1950, now abandoned.

Process for making herein described catalyst is claimed in co-pending application Serial No. 240,295, filed August 3, 1951, by C. Woolf and C. B. Miller, now Patent No. 2,673,139.

We claim:

1. The process of contacting a gaseous material comprising $CH_3CClF_2$, at temperature in the approximate range of 270–360° C., with substantially anhydrous aluminum fluoride catalyst, having crystallite size below about 500 Angstrom units radius and having been derived by reaction of aluminum chloride and HF, for a period in the approximate range of 4–70 seconds, to thereby form $CH_3CF_3$ and a lesser amount by weight of $CH_2=CCl_2$.

2. The process for converting $CH_3CClF_2$ to $CH_3CF_3$ and $CH_2=CCl_2$ which comprises continuously introducing gaseous $CH_3CClF_2$ into a reaction zone containing substantially anhydrous aluminum fluoride catalyst having crystallite size below about 200 Angstrom units radius and having been derived by reaction of aluminum chloride and HF, heating said $CH_3CClF_2$ in said zone at temperature in the approximate range of 270–360° C. for a period in the approximate range of 4–70 seconds, continuously withdrawing from said zone gaseous products containing $CH_3CF_3$ and a lesser amount by weight of $CH_2=CCl_2$, and separately recovering $CH_3CF_3$ and $CH_2=CCl_2$ from said gaseous products.

References Cited in the file of this patent

UNITED STATES PATENTS

| | | |
|---|---|---|
| 2,478,201 | Miller et al. | Aug. 9, 1949 |
| 2,478,932 | Bratton et al. | Aug. 16, 1949 |
| 2,478,933 | Miller et al. | Aug. 16, 1949 |
| 2,676,996 | Miller et al. | Apr. 27, 1954 |